(12) United States Patent
Chabrol et al.

(10) Patent No.: US 8,351,063 B2
(45) Date of Patent: Jan. 8, 2013

(54) METHOD AND SYSTEM FOR PRINT JOB PROCESSING

(75) Inventors: Alexandre Chabrol, Montpellier (FR); Benoit Granier, Vailhauques (FR); Aurelien Jarry, Montpellier (FR); Arnaud Mante, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 1288 days.

(21) Appl. No.: 12/107,861

(22) Filed: Apr. 23, 2008

(65) Prior Publication Data

US 2008/0291490 A1    Nov. 27, 2008

(30) Foreign Application Priority Data

May 23, 2007    (EP) .................................... 07108740

(51) Int. Cl.
| | |
|---|---|
| G06F 3/12 | (2006.01) |
| G06F 17/00 | (2006.01) |
| G06K 15/00 | (2006.01) |
| G06K 9/54 | (2006.01) |
| H04N 1/40 | (2006.01) |
| G06Q 40/00 | (2012.01) |

(52) U.S. Cl. ..... 358/1.15; 358/1.18; 358/487; 358/1.16; 235/375; 705/35; 382/306; 382/305

(58) Field of Classification Search .................. 358/1.15, 358/1.13, 487, 1.18, 527; 355/41, 40, 77; 715/826; 705/1.1
See application file for complete search history.

(56) References Cited

U.S. PATENT DOCUMENTS

| | | | | |
|---|---|---|---|---|
| 5,435,544 | A | * | 7/1995 | Mandel ......................... 271/298 |
| 5,703,701 | A | * | 12/1997 | Yamamoto et al. ........... 358/487 |
| 5,860,073 | A | * | 1/1999 | Ferrel et al. .................... 715/255 |
| 5,923,013 | A | * | 7/1999 | Suzuki et al. ................. 235/375 |
| 5,974,401 | A | * | 10/1999 | Enomoto et al. ............... 705/40 |
| 6,433,888 | B1 | * | 8/2002 | Patton et al. ................. 358/1.18 |
| 6,657,702 | B1 | * | 12/2003 | Chui et al. ...................... 355/40 |
| 7,456,987 | B2 | * | 11/2008 | Morikawa .................... 358/1.15 |
| 7,634,065 | B2 | * | 12/2009 | Fukunaga et al. ......... 379/88.13 |
| 7,684,995 | B2 | * | 3/2010 | McIntyre et al. .............. 705/1.1 |
| 2003/0225946 | A1 | * | 12/2003 | Allen et al. ....................... 710/8 |
| 2003/0226885 | A1 | * | 12/2003 | Harris ........................... 235/375 |
| 2004/0080546 | A1 | * | 4/2004 | Fritz ............................. 345/826 |
| 2005/0094193 | A1 | | 5/2005 | Oswald | |

FOREIGN PATENT DOCUMENTS

| | | |
|---|---|---|
| JP | 2005107741 | 4/2005 |
| JP | 2005107837 | 4/2005 |
| JP | 2006103283 | * 4/2006 |

* cited by examiner

*Primary Examiner* — Akwasi M Sarpong
(74) *Attorney, Agent, or Firm* — Yuanmin Cai (57) ABSTRACT

Print jobs received at a printer are assigned a reference which is incorporated as a representation of the reference in the printed print job. When the user recovers the printjob, the part of said print job incorporating said representation of said reference. is scanned back into the printer, which is then able to read the representation. By monitoring the time intervening between the printing of the print job and the scanning of the part of the print job incorporating the representation, the system is able to monitor the delay, and in a case where this exceeds a threshold to notify the user accordingly.

13 Claims, 11 Drawing Sheets

METHOD AND SYSTEM FOR PRINT JOB PROCESSING

CLAIM OF PRIORITY

This application claims priority to European Application No. 07108740.7 filed May 23, 2007, the entire content of which is incorporated by reference herein.

RELATED APPLICATIONS

This application is related to subject matter described and claimed in U.S. patent application Ser. No. 12/107973 entitled "Method and System for Print Job Processin" by the inventors of the instant application.

FIELD OF THE INVENTION

The present invention relates to the field of printing, more particularly to document printing, and still more particularly to the handling of print jobs, in a network printing environment.

BACKGROUND OF THE INVENTION

It is increasingly common for a number of work stations to share a printer by means of a network. The shared printer or printers may be an appreciable distance from some work stations. Although high speed printers will generally be preferred for such shared situations, there will often be a substantial delay between the moment when a job is submitted for printing, and the moment when it is in fact available for collection. This situation leaves users with a choice of going early to fetch their completed print job and running the risk that the job is not in fact complete, so that the trip is wasted, or of waiting a long time, thereby interrupting the activity to which the print job is related and increasing the chance of the print job being misplaced whilst waiting for collection, and even being read by parties for whom it is not intended. A number of partial solutions to this set of problems have been proposed. Another issue is that a user may be confronted with a large number of different print jobs that have been printed recently, amongst which he must locate his own print job. A known partial solution to this problem is for the system to automatically add a cover page to each print job hardcopy identifying the user associated therewith, so that print jobs can be easily identified and distributed. A drawback of this approach is that it results in a large number of extra pages being printed, which are generally discarded as soon as the completed print job is recovered. A still further problem is that during the indeterminate period between a document being printed, and being recovered by the appropriate user, there is an opportunity for the document to be misplaced, or even misappropriated. It is possible for the user who requested the print to fail to recover the document within an appropriate time frame, or even to forget the document entirely.

The Patent application JP 2006103283 A2 entitled "Printing System" relates to a printing system for detecting a state that printed material is left in the paper discharge tray for a long time and can notify a user of the same. The system of patent publication uses RFID tag and RFID tag reading means for detecting printed material in paper discharge tray. The system of this publication comprises a RFID reading/writing part. At the time of the printing, the RFID reading writing part writes user identification information on a RFID tag of a printing paper supplied to the system. The user identification information can be used to identify a user who requests printing. After the completion of the printing, an RFID reading part monitors the printed material. If the printed material is detected by RFID reading part to be in the paper discharge tray after a predetermined interval of time, the user is sent a notification.

An obvious disadvantage of this approach is its dependence on the integration of RFID tags in standard print stock. Furthermore, it does not provide any teaching relevant to the issue of waste cover pages.

The Patent application JP 2005107741 A2 entitled "Printing job completion notification system for printing system" relates to a method and system for print job completion notification system. A user sends a printing job for printing to the system of patent publication using email. The system comprises a printer that comprises a printing job interpretation part. The printing job interpretation part receives and interprets the email and identifies the printing job. The printing job interpretation part further extracts an email address from the email. Thereafter, the printing job is executed by the printer. After completion of the print job the user is sent a notification on the email address.

Similarly the patent application JP 2005107837 A2 entitled "Printing job completion notification system" relates to a method and system for print job completion notification system. The system of patent publication comprises a computer system and a printing system. The computer system can be used for creating and sending a printing job. The computer system further adds an identification code along with the printing job. The printing system further comprises a storage device, a printing job interpretation part and a notification processing part. The storage device stores a computer identifier and a corresponding address. The computer identifier can be used for identifying a computer system and a notification destination can be used to send notifications. A user sends a first printing job to the printing system, thereafter, the printing job interpretation part identifies a first computer identifier and a first identification code from the first printing job. After printing of the first printing job, the notification processing part identifies a first notification destination from the storage device using the first computer identifier. Thereafter, a notification is sent to the computer system for completion of the first printing job.

Again, the patent application US 20050094193 A1 entitled "Print driver system and method for print job notification" relates to a method and system for digital document processing. The method comprises accepting a document for printing and thereafter, presenting a user interface for accepting print job commands. The print job commands can, for example, be selection of a printer etc. The method further comprises presenting a user interface for receiving notification commands. The notification commands can, for example, be an email address for receiving notifications. After receiving the notification commands, the document is sent for printing. The method further comprises sending a print job notification. The print job notification can, for example, include printing job completion notification, an error notification etc.

While this approach may lessen the tendency for users to delay recovering their documents, it will not be of any assistance in helping them identify their print job, or ensuring that it is not left for an unduly long period.

SUMMARY OF THE INVENTION

According to the present invention there is provided a method of processing a print job, a non-transitory machine-readable storage medium thereupon stored a computer program having instructions that are executed on a computer to carry out the method, and a system and a printer being adapted to carry out the method.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which:

FIG. 2b shows details of the hardware configuration suitable for implementing a first embodiment of the invention in an intermediate phase following the initial phase described with reference to FIG. 2a;

FIG. 4b shows details of the hardware configuration suitable for implementing a third embodiment of the invention in an intermediate phase following the initial phase described with reference to FIG. 4a;

DETAILED DESCRIPTION

Figure 1:
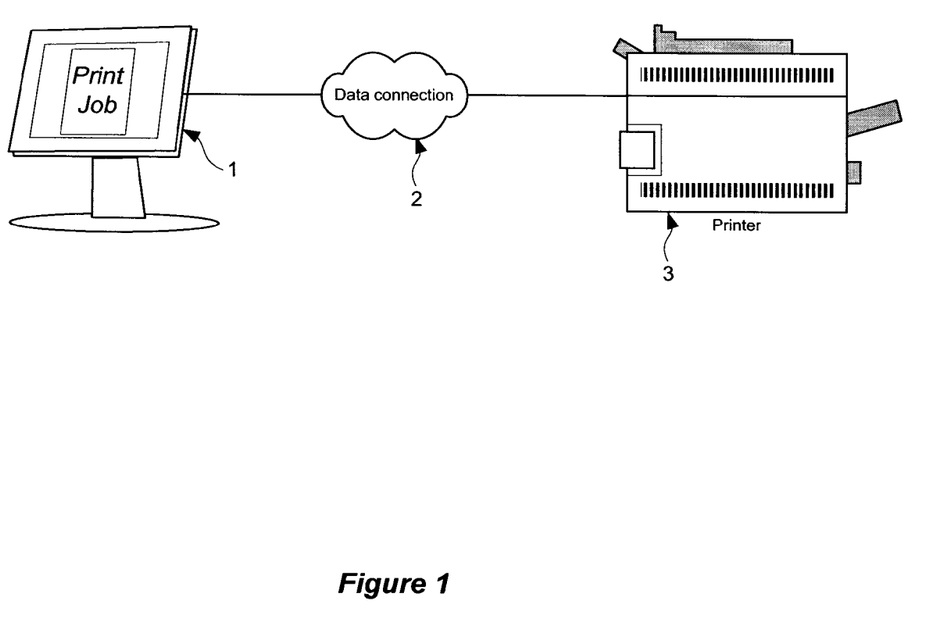
FIG. 1 shows a hardware configuration suitable for implementing embodiments of the invention.

FIG. 1 shows a hardware configuration suitable for implementing embodiments of the invention. As shown in FIG. 1 there is provided a requesting entity 1, a data connection 2 and a printer 3.

In the following description, the expression "print job" may be used to refer to a particular task assigned to the printer by a requesting entity, at any stage of the printing process, i.e. in electronic form, or in printed, hardcopy form. A print job may become associated with further components during the printing process, for example by action of the printer itself, which components may thereafter be considered as forming an integral part of the print job, or not, as appropriate. The expression "completed print job" may be used to refer to the print job in its final form incorporating any such further components.

The requesting entity may be for example a user workstation, or any other device capable of initiating a print job. The data connection may comprise any electronic means for relaying data between the requesting entity and the printer. According to certain embodiments the data connection is a data network such as an Ethernet network, although any communications protocol may equally be used, for example Infiniband, IPX, AppleTalk, NETBEUI or TCP/IP based networks.

The printer may be any device capable of forming patterns on sheet media, for example by thermal, inkjet, laser or other means. The media are not limited to paper, but may also include any other printable medium such as envelopes, business cards, transparencies, optical discs etc. Where the following embodiments refer to a paper handling mechanism, it will be appreciated that the functions assigned thereto may be accomplished by similar mechanisms adapted as a function of the medium in question.

Certain embodiments call for the emission of notifications. Such notifications may be of any kind-in text, by audio means etc. They may be transmitted by means of any data connection as described above, for example in the form of an email or instant messaging communication, or by SMS, voicemail or any other suitable means.

In accordance with certain embodiments, when the requesting entity 1 submits print job data with the data connection 2, for example by means of a user of the requesting entity manipulating a print instruction dialog in the user interface of the requesting entity or otherwise, the print job data are received from a requesting entity by the printer 3, and proceeds to assign a reference to the print job data. This is provided to make possible unique identification of the print job data from other print jobs that the printer may be handling or recently have handled, or that may be present on the data connection, or have been submitted by the requesting entity. According to certain embodiments the reference may incorporate a serial number. The reference may also incorporate a reference to the requesting entity or the user of the requesting entity. The reference may incorporate a user name, or a reference to the network location of the originating entity, or any other information that may assist a user in correctly identifying a completed print job as belonging to him. The printer 3 proceeds to print the print job hardcopy incorporating a representation of said reference. The representation may be in visible form such as for example a human readable form, and/or in a machine readable form. The representation may comprise a bar code, and/or alphanumeric or similar human readable characters, or an RFID or other electronically detectable representation. The reference may be notified to the requesting entity, in particular when it is in a visible or human readable form. A user may then retrieve the print job hardcopy using the representation printed thereon as a means to identify the particular print job hardcopy in question. Finally, a part of the print job hardcopy incorporating a representation of the reference is scanned, for example using an optical scanner associated with the printer in the case where the representation is visible or other scanner suitable for reading whatever format of representation is used. The expression scanner or scanning as used hereafter is intended to cover all such arrangements, although in preferred embodiments an optical scanner of the kind often incorporated in or associated with a printer is used. This step of scanning is preferably initiated by a user on recovering the print job hardcopy.

By scanning the part of the print job hardcopy incorporating visual representation back into the printer it becomes possible to detect the moment at which a print job hardcopy is recovered.

Figure 2A:
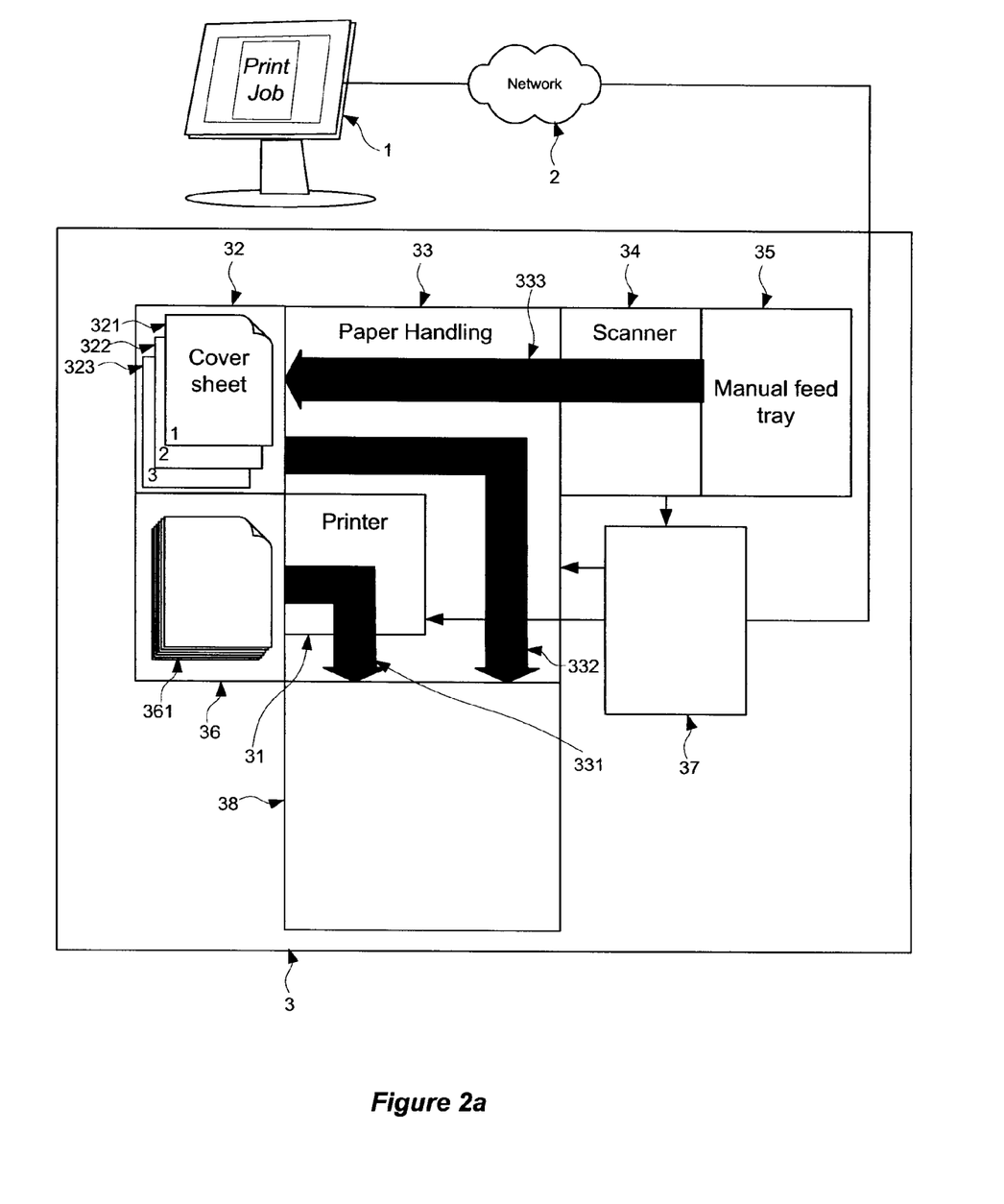
FIG. 2a shows details of the hardware configuration suitable for implementing a first embodiment of the invention in an initial phase.

FIG. 2a shows details of the hardware configuration suitable for implementing a first embodiment of the invention in an initial phase. In particular, as shown in FIG. 2a the printer 3 comprises an image formation unit 31, a first paper tray 32, a second paper tray 36, paper handling mechanism 33, a scanner 34, a manual feed tray 35, a control unit 37 and an output tray 38. While the printer described is typical of network printers, the skilled person will appreciate that a very wide range of variations on this configuration are possible. In particular, a number of functions may be provided by physically separate units or modules, for example by separating the scanner from the other components. the control unit may be a processor integrated in the printer, or may be a printer server or other data processing devices suitable for controlling the various components of the printer. More or fewer paper trays, feed trays and output trays may be provided. the paper handling mechanism may be more or less sophisticated, and may be separated into a number of modules. As shown, the paper handling module is capable of conveying pages from the first paper tray 32 to the output tray 38, from the second paper tray 36 via the image forming unit 31 to the output tray 38, and from the manual feed tray 35 via the scanner 34 to the first paper tray 32. Further flow paths may be provided in accordance with other printer functions.

When print job data is submitted by the requesting entity 1, the relevant data are received by the processor 37, which instructs the paper handling mechanism and image forming unit to implement the various steps as described hereafter. In particular, the paper handling mechanism draws paper from the second paper tray 36, and through the image forming unit 31 and into the output tray 38, substantially as known from conventional printers. In certain embodiments the selection of a reference and its assignment to a particular print job may also be wholly or partially carried out by the processor 37.

In accordance with a first embodiment the part of said print job hardcopy incorporating said reference is a reusable printjob addendum. The reusable printjob addendum is preferably a flexible sheet of dimensions suitable for manipulation by a printer's paper handling mechanism. It may simply comprise a sheet of paper, or preferably a sheet formed of a more robust material such as a plastic sheet, plastic based or similar "untearable paper" etc. As shown in FIG. 2a one or more such reusable elements 321, 322, 323 are stored in said first paper tray, or reusable printjob addendum reservoir 32. These reusable elements are pre-printed with respective visual representations of references as described above.

Figure 2B:
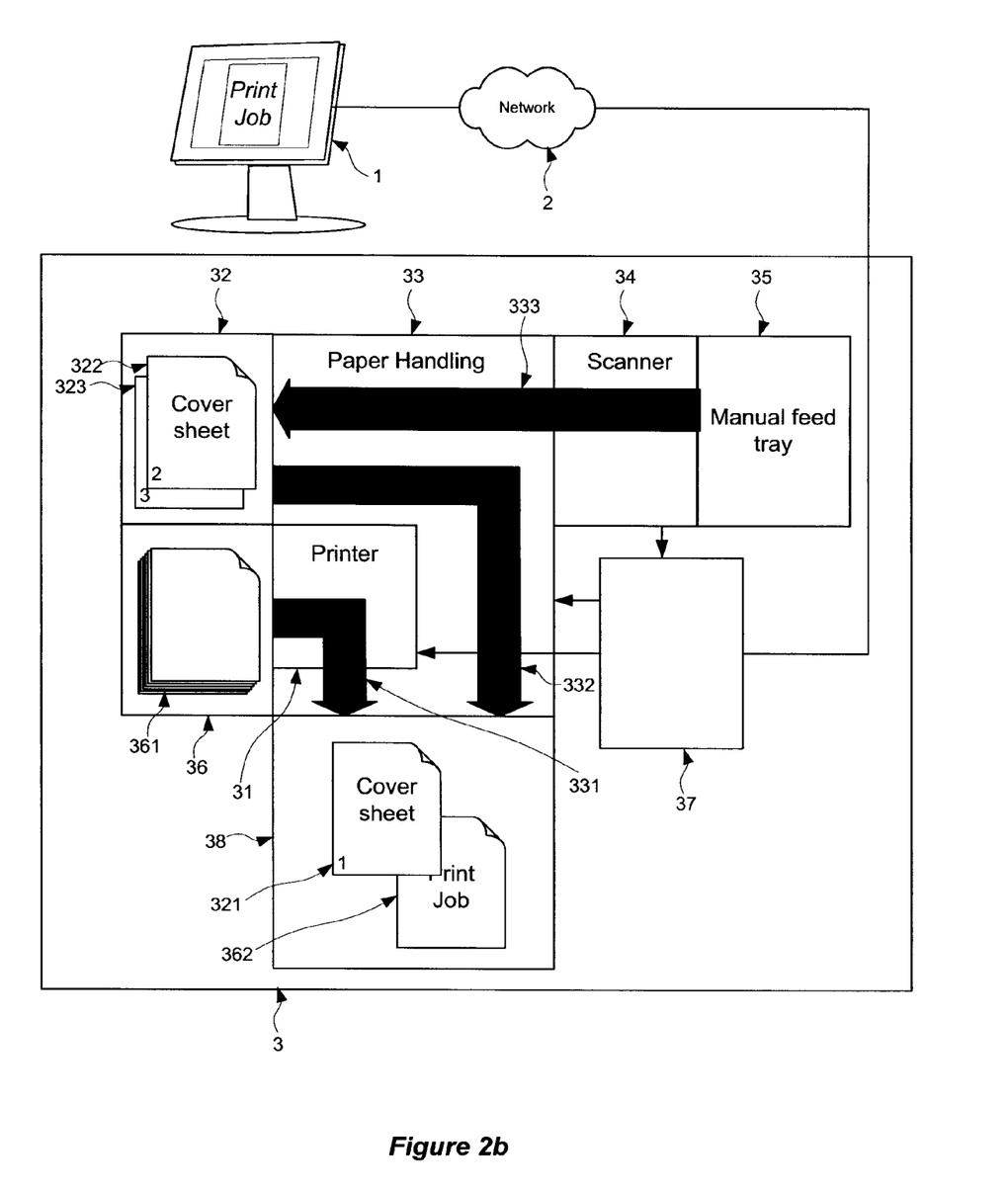

FIG. 2b shows details of the hardware configuration suitable for implementing a first embodiment of the invention in an intermediate phase following the initial phase described with reference to FIG. 2a. As shown the printer comprises a paper handling mechanism 33 which provides for a number of different paper flow paths 331, 332, 333. When a print job hardcopy is printed, via paper flow path 331 as described above, in accordance with the first embodiment a reusable printjob addendum 321 bearing a representation of said reference is retrieved from the reusable printjob addendum reservoir 32, and incorporated with the print job hardcopy by the action of the paper handling mechanism 33 via paper flow path 332, so that the print job hardcopy and the reusable printjob addendum are ejected together into the output tray 38. A notification of the reference is supplied to the requesting entity. The reference may be displayed or otherwise presented to a user of the requesting entity, so that the user may then correctly identify the print job in question waiting in the output tray 38.

Figure 2C:
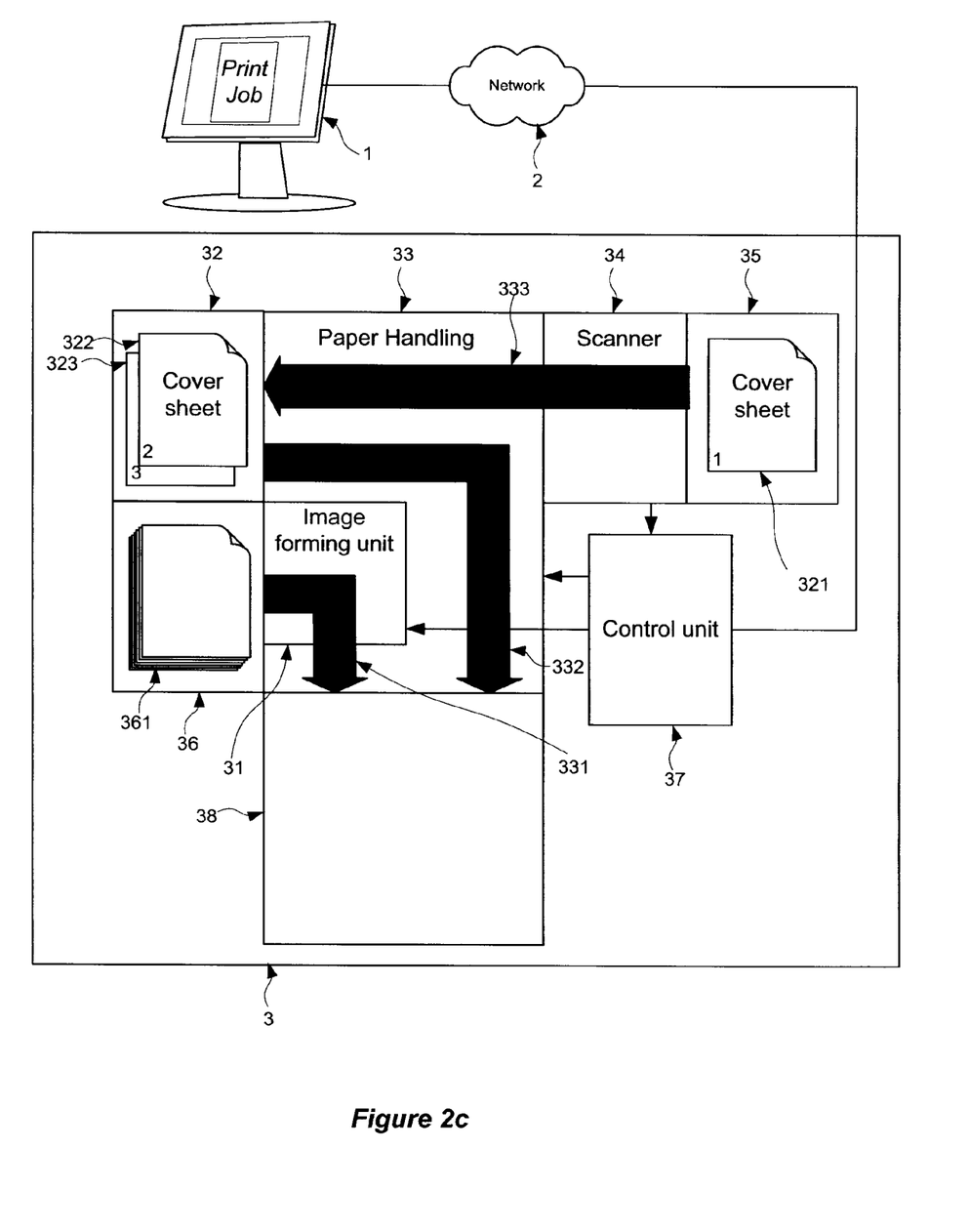
FIG. 2c shows details of the hardware configuration suitable for implementing a first embodiment of the invention in a final phase following the intermediate phase described with reference to FIG. 2b.

FIG. 2c shows details of the hardware configuration suitable for implementing a first embodiment of the invention in a final phase following the intermediate phase described with reference to FIG. 2b. In accordance with the first embodiment, a user recovering the print job hardcopy from the output tray is required to scan a part of said print job hardcopy incorporating said representation, that is, the reusable printjob addendum. To do this, the reusable printjob addendum is placed in the manual feed tray 35, and by the action of the paper handling mechanism 33 is scanned by the scanner 34 and returned to the first paper tray or reusable printjob addendum reservoir 32, thus reducing the waste of paper that is often used to separate printjobs and then simply discarded.

Preferably, in a case where there are provided a plurality of reusable printjob addenda each bearing a different respective representation of a reference, the processor 37 is adapted to track which reusable printjob addenda are present in the reusable printjob addendum reservoir 32 at a given moment. The processor can keep track of the reusable printjob addenda that have been checked out of the reusable printjob addendum reservoir 32. Meanwhile, it is the fact that the part of said print job hardcopy incorporating said representation of said reference is scanned when each print job hardcopy is collected, and the reusable printjob addendum is then returned to the reusable printjob addendum reservoir 32 that enables the processor to check reusable printjob addenda back in again for later reuse. Where this is the case, the assignment of a reference to a particular print job is carried out with reference to the printjob addenda present in said reusable printjob addendum reservoir 32 at the time in question.

According to certain embodiments there is provided a predefined set of reusable printjob addenda, from which a reusable printjob addendum is selected for each new print job. In this approach it may be preferable to use references that are not specific to particular users or originating entities, since otherwise it may be necessary to provide at least one reusable printjob addendum for every possible user or originating entity, possibly more in view of the possibility of the same user initiating a number of print jobs in short succession. Such non specific references may include arbitrary alphanumeric strings, simple serial numbers and so on. One may envisage embodiments where the reference is the colour of the sheet itself or an image printed on the sheet. Another advantage of this approach is that the printer can simply use the top reusable printjob addendum from the stack in the reusable printjob addendum reservoir 32, without any need to sort the contents of the paper tray or to select a particular reusable printjob addendum for a particular print job.

On the other hand, it may be desirable to include more user specific data in the reference, such as a user name, personal name, network ID, network address of the originating entity, etc. Under these circumstances, rather than providing sufficient reusable printjob addenda to allow every user to make multiple prints under his own name, one solution would be to provide a set of user unique reusable printjob addenda, and a set of generic printjob addenda similar to those described in the preceding paragraph to provide for situations where a user specific reusable printjob addendum is not available, for example because no user specific reusable printjob addenda has been provided e.g. for a new user, or because the same user has initiated a number of consecutive print jobs and exhausted his stock of user specific reusable printjob addenda. In such cases where no user specific printjob addendum was available, a generic reusable printjob addendum could be assigned as described in the preceding paragraph. An alternative solution would be to enable the printer to generate reusable printjob addenda on the fly, that is to draw a blank reusable element from a reservoir and to print details on it to satisfy a present requirement for example by means of the image forming unit 31, e.g. for a particular user. The newly generated reusable printjob addendum would of course be scanned and returned to the said reusable printjob addendum reservoir 32 in the usual manner, and thereafter reused whenever needed by that same user. A result of this approach may be a tendency for the number of reusable printjob addenda in the reusable printjob addendum reservoir 32 to increase over time, to a point where the number of reusable printjob addenda may exceed the capacity of the reusable printjob addendum reservoir 32, or otherwise become impractical. One solution for this problem may be for the control unit 37 to maintain a record of the usage of different reusable printjob addenda so as to allow for a purge of the less useful reusable printjob addenda. Another consideration in providing for user specific reusable printjob addenda is the need for the printer to successfully retrieve the appropriate printjob addendum for a particular print job. This may call on the control unit 37 to maintain a record of the position of the various printjob addenda defined in the system, and their position either in the reusable printjob addendum reservoir 32 or elsewhere. Furthermore the printer must provide the mechanical means to select a specific reusable printjob addendum, either by selection from a large number of reusable printjob addenda in a common reusable printjob addendum reservoir, or by dividing the reusable printjob addendum reservoir 32 into a number of sub reservoirs each containing a particular reusable printjob addendum, or otherwise.

Even in a case where a set of generic reusable printjob addenda is used, it may be advantageous to enable the printer to generate such printjob addenda itself from blank stock.

The reference may also be present on the reusable print element in other formats for example those not intended for optical reading. Sheets may for example also include a representation of the reference in Braille or the like, enabling visually impaired users to successfully retrieve printjobs.

According to a second embodiment, which may be realised in a system similar to that described above with respect to FIGS. 2a, 2b and 2c, the delay between the steps of printing a print job hardcopy incorporating a representation of the reference and of scanning the part of the print job hardcopy incorporating the representation of the reference is monitored, and in a case where the delay exceeds a predetermined threshold carrying out a further notification step. This further notification may comprise notifying the requesting entity, in other words in issuing a reminder that the print job hardcopy is still waiting to be collected. The further notification may still further comprise notifying another user or entity altogether, for example a hierarchal superior to the user of the requesting entity, an administrative assistant to the user of the requesting entity, etc.

Figure 3:
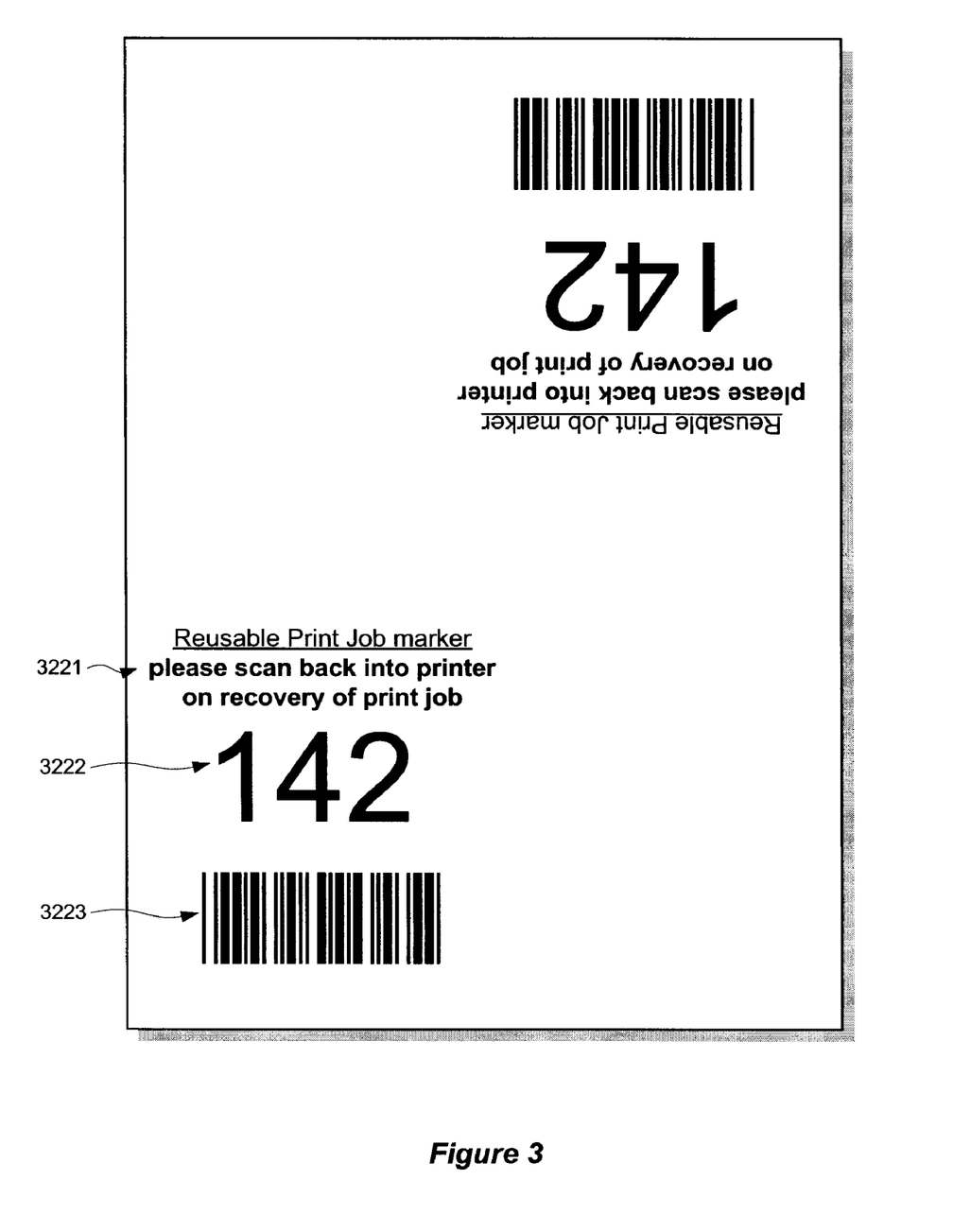
FIG. 3 shows a reusable printjob addendum as described with respect to FIGS. 2a to 2c.

FIG. 3 shows a reusable printjob addendum as described with respect to FIGS. 2a to 2c. As shown in figure there is shown a flexible sheet of standard format corresponding to the principle format handled by the printer. Common formats include ISO A4 and US Letter, but the reusable print job addendum can clearly be of any size as appropriate to the role of the printer in question. As shown a number of different sets of characters are printed or otherwise disposed on the reusable printjob addendum. In particular there is provided a text message 3221 to users providing instructions as to the proper usage of the reusable printjob addendum, in this case the legend "Reusable Print Job marker please scan back into printer on recovery of print job". There is further provided a human readable representation of a reference 3222, which in the shown example is the reference number "142". There is still further provided a machine readable representation 3223 of the same reference, in this case in the form of a bar code according to the 3 of 9 encoding standard, corresponding to the characters "*142*". As shown, the three elements 3221, 3222, 3223 are grouped together in one corner of the reusable printjob addendum, with the lines of text running parallel to the shorter edge of the sheet. Identical characters are provided in the opposite corner but inverted with respect to the first group of characters. The sheet may be printed in the same manner on both sides. Such a distribution may facilitate the task of scanning the sheet to identify the reference, since regardless of the orientation of the reusable printjob addendum as it arrives in the output tray or as it is fed into the scanner, a copy of the text data will be present in the same position with the same orientation. Similarly, this approach obviates any need to manage the orientation of reusable printjob addenda in the paper tray 32.

Figure 4A:
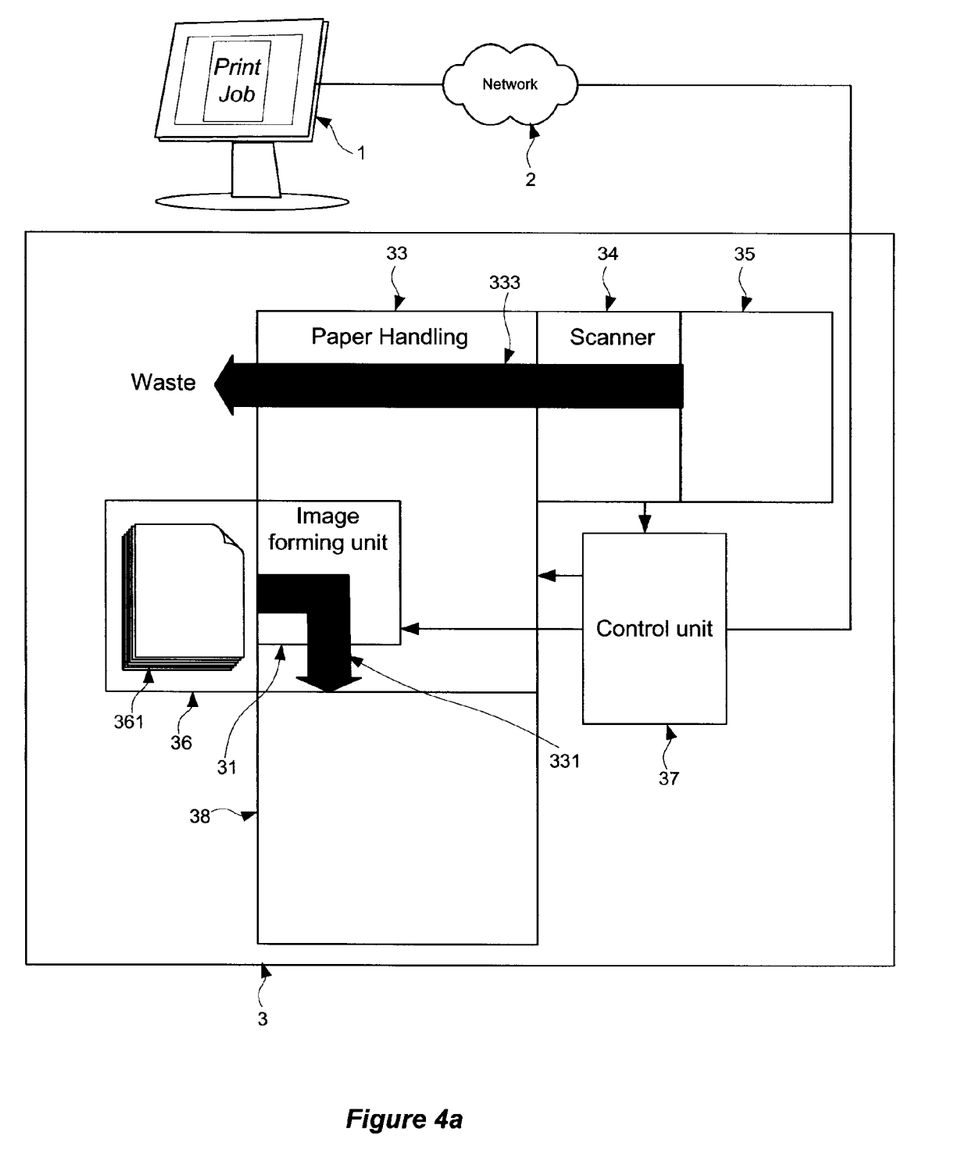
FIG. 4a shows details of the hardware configuration suitable for implementing a third embodiment of the invention in an initial phase.
Figure 4B:
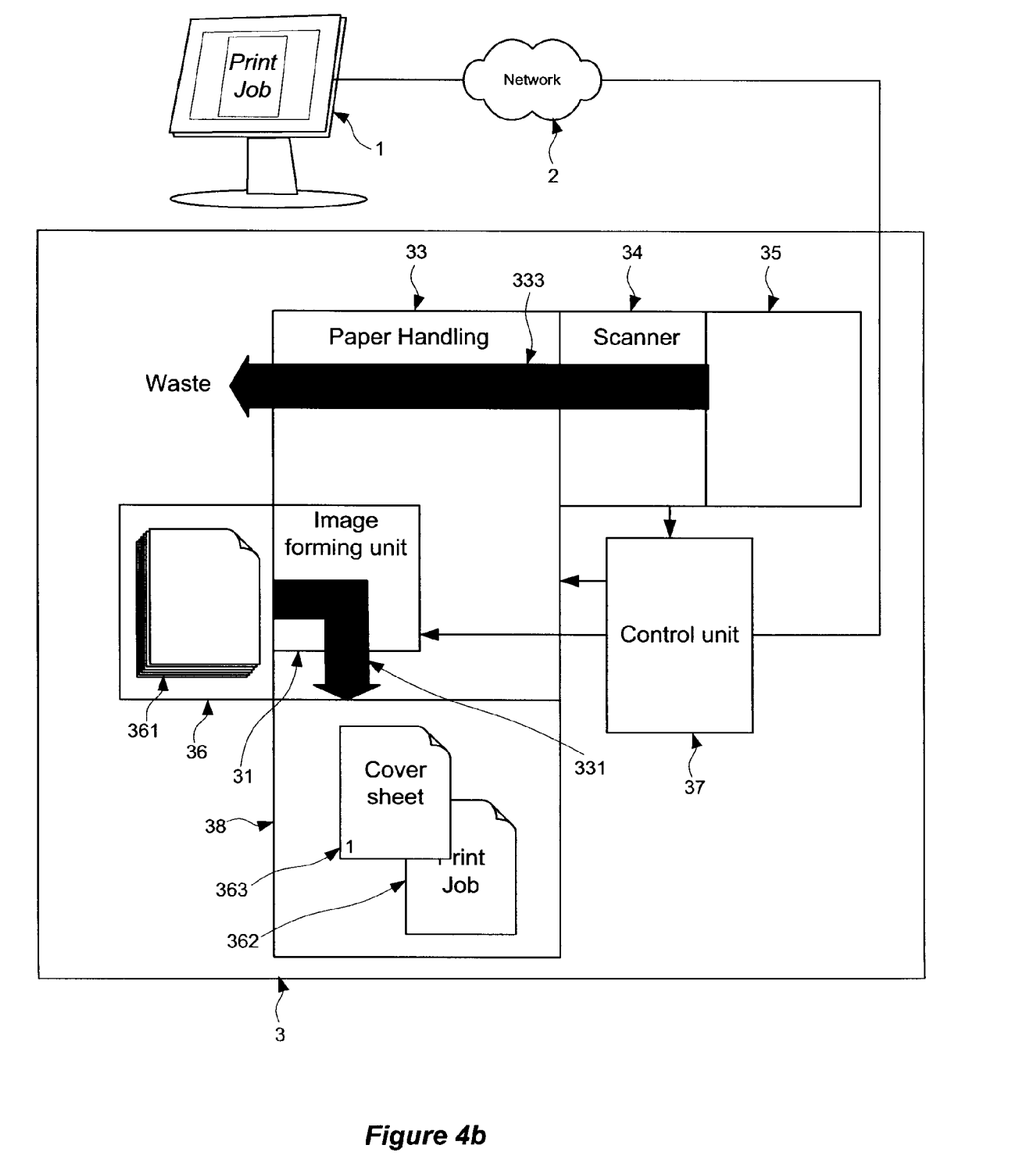
Figure 4C:
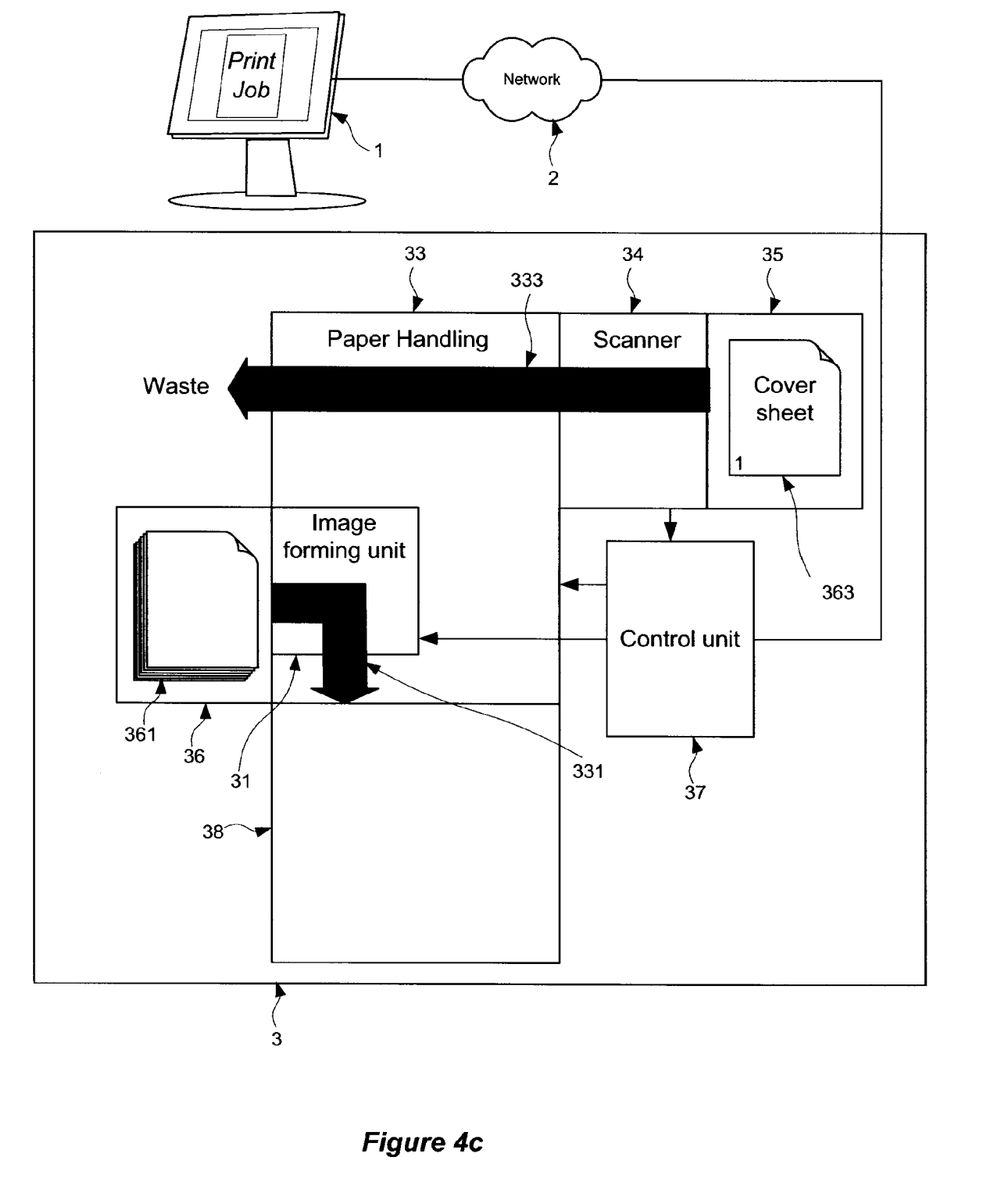
FIG. 4c shows details of the hardware configuration suitable for implementing a third embodiment of the invention in and final phase following the intermediate phase described with reference to FIG. 4b.

FIGS. 4a to 4c show a third embodiment of the invention.

FIG. 4a shows details of the hardware configuration suitable for implementing a third embodiment of the invention in an initial phase. In particular, as shown in FIG. 4a the printer 3 comprises an image formation unit 31, a second paper tray 36, a paper handling mechanism 33, a scanner 34, a manual feed tray 35, a control unit 37 and an output tray 38. While the printer described is typical of network printers, the skilled person will appreciate that a very wide range of variations on this configuration are possible. In particular, a number of functions may be provided by physically separate units or modules, for example by separating the scanner from the other components. The control unit may be a processor integrated in the printer, or may be a printer server or other data processing devices suitable for controlling the various components of the printer. More or fewer paper trays, feed trays and output trays may be provided. The paper handling mechanism may be more or less sophisticated, and may be separated into a number of modules. As shown, the paper handling module is capable of conveying pages from the second paper tray 36 via the image forming unit 31 to the output tray 38, and from the manual feed tray 35 via the scanner 34 to a waste outlet. Further flow paths may be provided in accordance with other printer functions.

When print job data is submitted by the requesting entity 1, the relevant data are received by the processor 37, which instructs the paper handling mechanism and image forming unit to implement the various steps as described hereafter. In particular, the paper handling mechanism draws paper from the second paper tray 36, and through the image forming unit 31 and into the output tray 38, substantially as known from conventional printers. In certain embodiments the selection of a reference and its assignment to a particular print job may also be wholly or partially carried out by the processor 37.

In accordance with the third embodiment the part of said print job hardcopy incorporating the reference is a disposable printjob addendum, which may comprise an extra sheet of material similar to that used for the main part of the print job hardcopy, which is not reused as described with respect to the first embodiment. The disposable printjob addendum 363 is preferably similar or identical to the material used for the remainder of the print job hardcopy, and still more preferably is identical material drawn from the same source 36. In any case, it is a flexible sheet of dimensions suitable for manipulation by a printer's paper handling mechanisms.

FIG. 4b shows details of the hardware configuration suitable for implementing a first embodiment of the invention in an intermediate phase following the initial phase described with reference to FIG. 4a. When a print job hardcopy is printed, as described above, in accordance with the third embodiment a disposable printjob addendum 363 bearing a representation of a reference is printed by the image forming unit 31 is fed to the output tray 38 together with the remainder of the print job hardcopy 362 from the reusable printjob addendum reservoir 32 by the action of the paper handling mechanism, so that the print job hardcopy and the disposable printjob addendum are ejected together into the output tray 38. A notification of the reference is supplied to the requesting entity. The reference may be displayed or otherwise presented to a user of the requesting entity, so that the user may then correctly identify the print job hardcopy in question waiting in the output tray 37.

FIG. 4c shows details of the hardware configuration suitable for implementing a third embodiment of the invention in a final phase following the intermediate phase described with reference to FIG. 4b. In accordance with the third embodiment, a user recovering the print job hardcopy from the output tray 38 is required to scan the part of said print job hardcopy incorporating said representation, that is, the disposable printjob addendum 363. To do this, the disposable printjob addendum 363 is placed in the manual feed tray 35, and by the action of the paper handling mechanism 33 is scanned by the scanner 34 and ejected via a waste outlet.

The disposable printjob addendum 363 may correspond substantially in appearance and content to that described above with reference to FIG. 3, with suitably amended text message.

The delay between the steps of printing a print job hardcopy incorporating a representation of the reference and of scanning the part of the print job hardcopy incorporating the representation of the reference is monitored, and in a case where the delay exceeds a predetermined threshold a further notification step is carried out. This further notification may comprise notifying the requesting entity, in other words in issuing a reminder that the print job hardcopy is still waiting to be collected. The further notification may still further comprise notifying another user or entity altogether, for example a hierarchal superior to the user of the requesting entity, an administrative assistant superior to the user of the requesting entity, etc.

Figure 5:
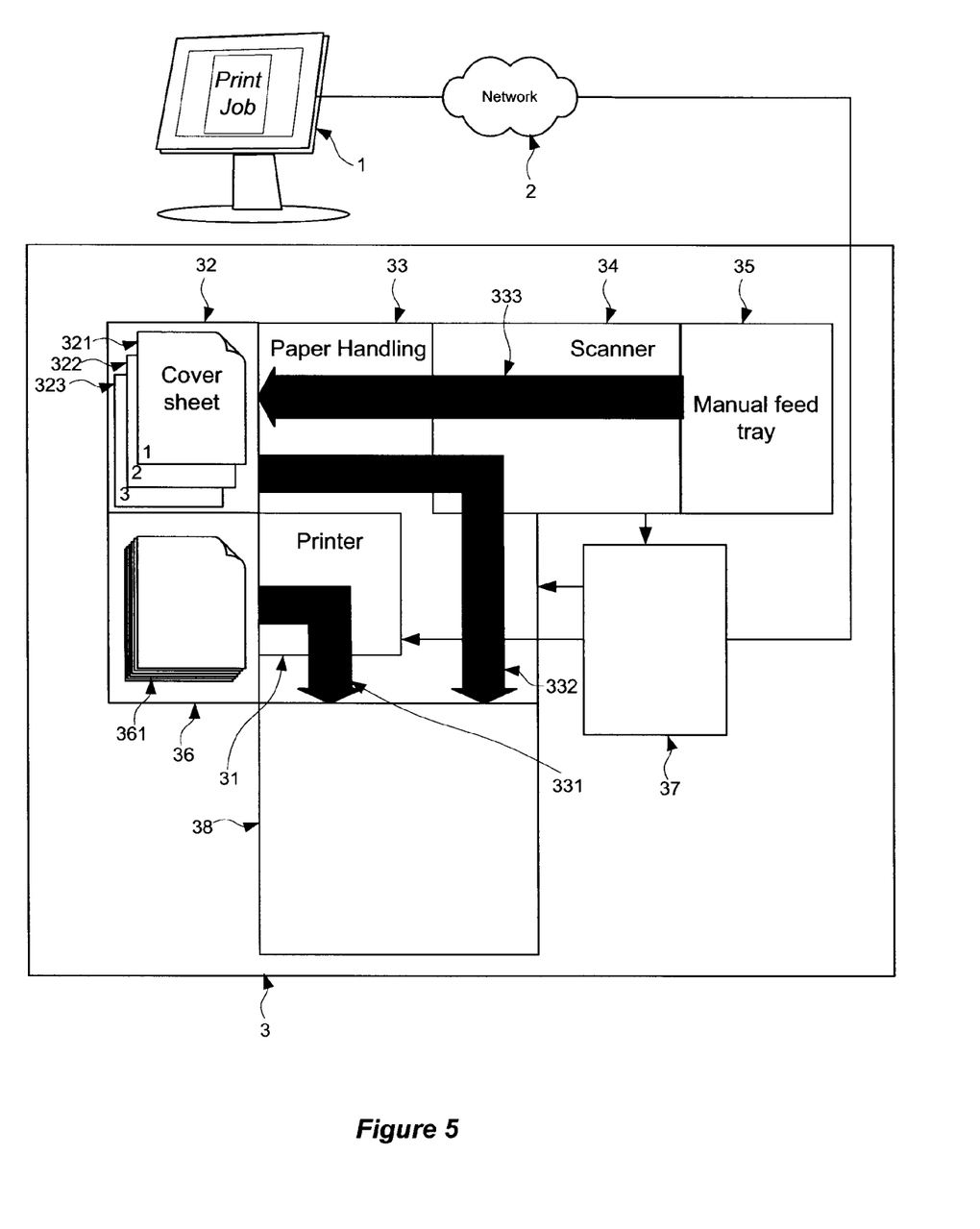
FIG. 5 shows details of the hardware configuration suitable for implementing a fourth embodiment of the invention.

FIG. 5 shows details of the hardware configuration suitable for implementing a fourth embodiment of the invention. In particular, as shown in FIG. 5a the printer 3 comprises an image formation unit 31, a second paper tray 36, paper handling mechanism 33, a scanner 34, a manual feed tray 35, a control unit 37 and an output tray 38 Substantially as described above. As shown, the paper handling module 33 is capable of conveying pages from the second paper tray 36 via the image forming unit 31 to the output tray 38 via paper flow path 331, and from the manual feed tray 35 via the scanner 34 to a waste outlet via paper flow path 333. Flow path 332 from the from the reusable printjob addendum reservoir 32 to the output tray 38 differs from the flow described with respect to FIGS. 2a to 2c, in that the reusable printjob addendum drawn from the reusable printjob addendum reservoir 32 passes through the scanner 34 before reaching the output tray 38. Thereafter the invention may proceed substantially as described above. The fact that the reusable printjob addendum passes through the scanner in this manner opens further possibilities in that there is no longer any requirement for the system to manage or track the content of the reusable printjob addendum reservoir 32. The first available reusable printjob addendum may be selected, for example from the top or bottom of a stack of reusable printjob addenda in the reusable printjob addendum reservoir 32. The reusable printjob addendum thus retrieved is then scanned, and on the basis of the scanned information the system can identify the reusable printjob addendum. The system may then report this information to the user as described above.

Figure 6:
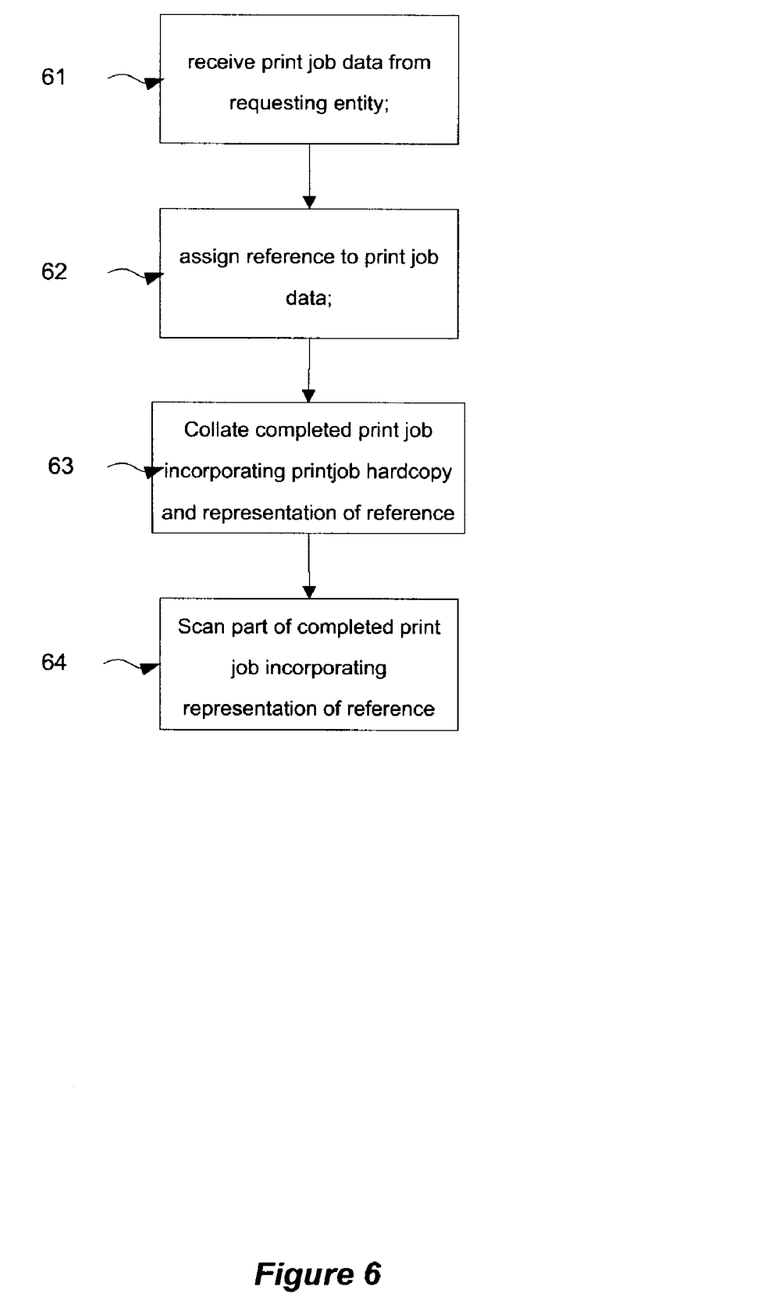
FIG. 6 shows the steps of a method corresponding to a realisation of any of the above described embodiments.

FIG. 6 shows the steps of a method corresponding to a realisation of any of the above described embodiments. As shown in FIG. 6 the first step 61 comprises receiving print job data from a requesting entity. At the next step 62 a reference is assigned to the print job. The method next proceeds to print said print job incorporating a representation of said reference at step 63, scanning a part of said print job incorporating said representation of said reference at step 64, thereby detecting the recovery of the print job by a user.

Figure 7:
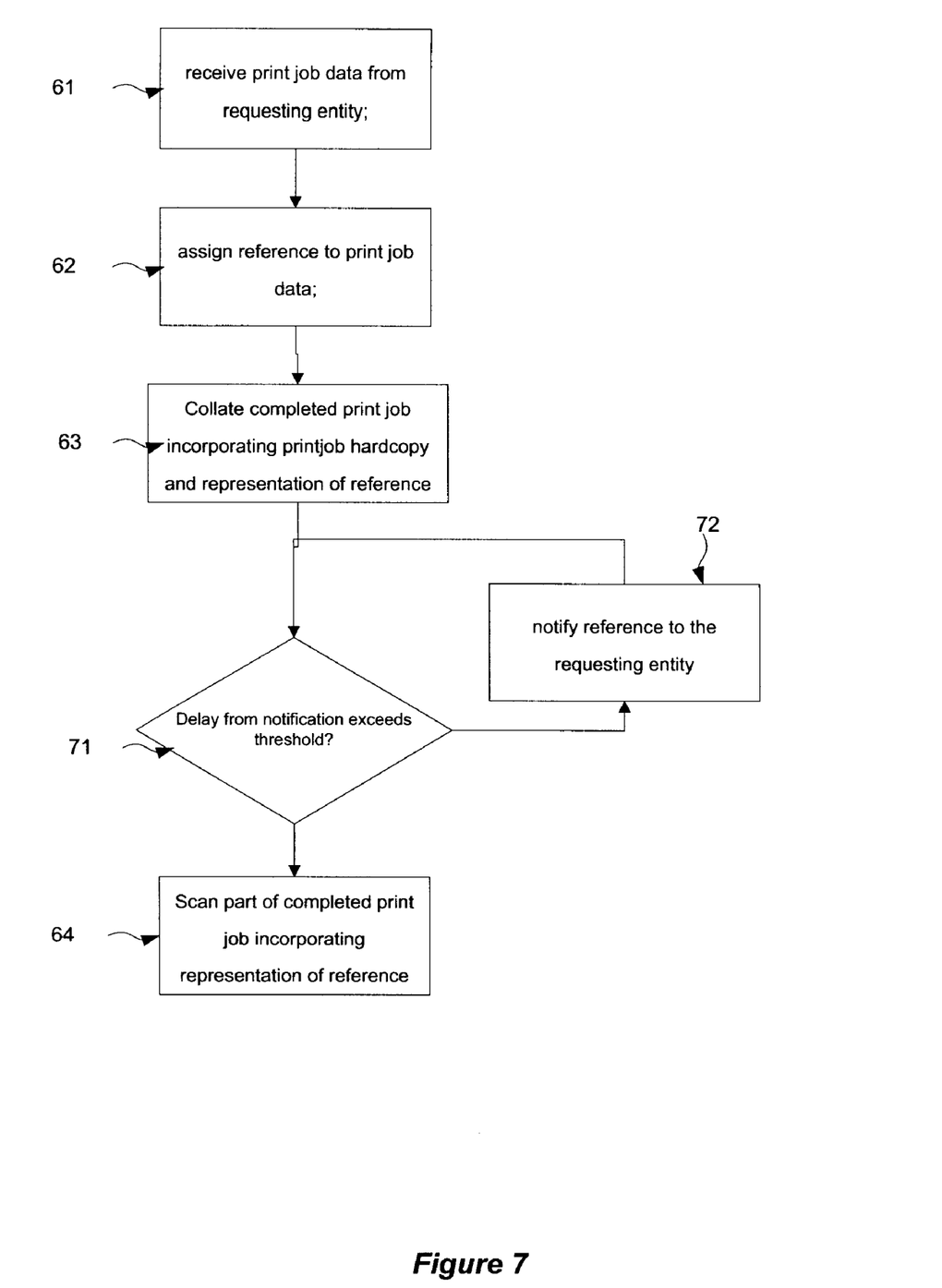
FIG. 7 shows the steps of a method corresponding to a realisation of the third embodiment.

FIG. 7 shows the steps of a method corresponding to a realisation of the third embodiment. The steps of FIG. 7 are identical to those of FIG. 6, with the exception that a new step 71 is interposed between steps 63 and 64 as described above, at which it is determined whether a delay between the notification of the reference to the user exceeds a predetermined threshold as described above at step 71, and in a case where this is found to be so, proceeding to step 72 of implementing a further notification as discussed above.

According to a further embodiment there is provided a method of processing a print job comprising the steps of: receiving a print job from a requesting entity; assigning a reference to said print job; printing said print job incorporating a representation of said reference; notifying said reference to the requesting entity; and scanning a part of said print job incorporating said representation of said reference.

According to a further embodiment print jobs received at a printer are assigned a reference which is incorporated as a representation of the reference in the printed print job. When the user recovers the printjob, the part of said print job incorporating said representation of said reference, is scanned back into the printer, which is then able to read the representation. By monitoring the time intervening between the printing of the print job and the scanning of the part of the print job incorporating the representation, the system is able to monitor the delay, and in a case where this exceeds a threshold to notify the user accordingly.

According to a further embodiment print jobs received at a printer are assigned a reference which is incorporated as a representation of the reference in the printed print job. When the user recovers the printjob, the part of said print job incorporating said representation of said reference. is fed back into the printer, for reuse in later print jobs.

The invention can take the form of an entirely hardware embodiment, an entirely software embodiment or an embodiment containing both hardware and software elements. It will in particular be appreciated that certain embodiments may be realised by means of entirely conventional printer hardware which may be modified by means of software or firmware modifications so as to implement those embodiments. In a preferred embodiment, the invention is implemented in software, which includes but is not limited to firmware, resident software, microcode, etc. Some or all features of the invention may be realised by means of software, firmware, machine code or the like, for example running in the control unit so as to cause the printer to carry out the printer 3 to carry out the various steps.

Furthermore, the invention can take the form of a computer program product accessible from a computer-usable or computer-readable medium providing program code for use by or in connection with a computer or any instruction execution system, for example a standalone computer controlling a printing system, or a processing part of a printer. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times that code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of processing a print job comprising steps of:
receiving print job data defining a print job from a requesting entity;
assigning a reference to said print job;
printing said print job as a print job hard copy, said print job hard copy incorporating a representation of said reference;
scanning a part of said print job hard copy;
monitoring a delay between said step of printing said print job as a print job hard copy and said step of scanning a part of said print job hardcopy, and
in a case where said delay exceeds a predetermined threshold, carrying out a further notification step,
wherein said part of said print job hard copy is a reusable print job addendum, wherein said step of printing said print job as a print job hard copy comprises further steps of retrieving a reusable print job addendum bearing a representation of said reference from a reusable print job addendum reservoir, and incorporating said reusable print job addendum with said print job, and wherein said step of scanning a part of said print job hardcopy comprises further steps of scanning said reusable print job addendum, and after said step of scanning a part of said print job hardcopy, returning said reusable print job addendum to said reusable print job addendum reservoir.

2. The method of claim 1 wherein said step of scanning is initiated by a user on recovering the print job.

3. The method of claim 1 wherein said representation comprises a bar code.

4. The method of claim 1 wherein said representation comprises human readable characters.

5. The method of claim 1 further comprising a step of scanning said reusable print job addendum prior to said step of assigning a reference to said print job; and wherein said reference is assigned on a basis of information gathered at said step of scanning said reusable print job addendum prior to said step of assigning a reference to said print job.

6. The method of claim 1 wherein said reusable print job addendum is a flexible sheet of dimensions suitable for manipulation by a printer's paper handling mechanisms.

7. The method of claim 1 wherein there are provided a plurality of reusable print job addenda each bearing a different respective representation of a reference said method further comprising a step of tracking which reusable print job addenda are present in said reusable print job addendum reservoir, and said step of assigning a reference to said print job being carried out with reference to the print job addenda present in said reusable print job addendum reservoir.

8. The method of claim 1 wherein said further notification step comprises notifying said requesting entity.

9. The method of claim 1 wherein said further notification step comprises notifying a further entity.

10. The method of claim 9 further comprising a step of consulting reference data to identify the further entity predefined for said requesting entity.

11. A non-transitory machine-readable storage medium thereupon stored a computer program, said computer program comprising instructions being executed on a computer to carry out the method according to claim 1.

12. A system comprising means adapted to carry out the method according to claim 1.

13. A printer comprising means adapted to carry out the method according to claim 1.

* * * * *